(12) United States Patent
Choi et al.

(10) Patent No.: US 10,466,845 B2
(45) Date of Patent: Nov. 5, 2019

(54) TOUCH SCREEN PANEL

(71) Applicant: Samsung Display Co., Ltd., Yongin-si (KR)

(72) Inventors: Shin Il Choi, Hwaseong-si (KR); Ji Hun Kim, Asan-si (KR); Bong-Kyun Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 38 days.

(21) Appl. No.: 15/079,881

(22) Filed: Mar. 24, 2016

(65) Prior Publication Data

US 2016/0334904 A1    Nov. 17, 2016

(30) Foreign Application Priority Data

May 12, 2015 (KR) .................. 10-2015-0066052

(51) Int. Cl.
*G06F 3/044* (2006.01)
*G06F 3/041* (2006.01)

(52) U.S. Cl.
CPC .... *G06F 3/044* (2013.01); *G06F 2203/04102* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| 5,100,508 | A | * | 3/1992 | Yoshida | G03F 7/0035 430/312 |
|---|---|---|---|---|---|
| 9,070,597 | B2 | | 6/2015 | Ahn et al. | |
| 9,217,890 | B2 | | 12/2015 | Park et al. | |
| 2005/0087758 | A1 | * | 4/2005 | Kwak | H01L 21/28575 257/99 |
| 2009/0101902 | A1 | * | 4/2009 | Lin | H01L 27/1214 257/59 |
| 2014/0104511 | A1 | * | 4/2014 | Liu | G06F 3/01 349/12 |
| 2015/0085456 | A1 | * | 3/2015 | Cok | H05K 1/0274 361/767 |

(Continued)

FOREIGN PATENT DOCUMENTS

| CN | 104451681 | 3/2015 |
|---|---|---|
| KR | 10-2014-0092683 | 7/2014 |

(Continued)

*Primary Examiner* — William Boddie
*Assistant Examiner* — Alecia D English
(74) *Attorney, Agent, or Firm* — H.C. Park & Associates, PLC

(57) ABSTRACT

A touch screen panel and a method of manufacturing the same. The touch screen panel includes: a plurality of touch electrodes disposed in a touch area of a substrate, the touch electrodes configured to sense a touch; and a connecting wire connected with the touch electrode and having a pad connected to one end. The connecting wire includes a first wire layer made of a metal nano wire disposed on the substrate, a second wire layer made of a first transparent conductive material, a third wire layer disposed on an upper surface of the second pad and made of a second transparent conductive material, and a fourth wire layer made of aluminum (Al) disposed on the third pad.

20 Claims, 6 Drawing Sheets

(56) References Cited

U.S. PATENT DOCUMENTS

| | | | |
|---|---|---|---|
| 2015/0214072 A1 | 7/2015 | Kim et al. | |
| 2015/0277630 A1* | 10/2015 | Kao | G06F 3/0412<br>345/174 |
| 2015/0293634 A1* | 10/2015 | Her | G06F 3/044<br>345/174 |

FOREIGN PATENT DOCUMENTS

| | | |
|---|---|---|
| KR | 10-2014-0137586 | 12/2014 |
| KR | 10-2014-0144566 | 12/2014 |

* cited by examiner

TOUCH SCREEN PANEL

CROSS-REFERENCE TO RELATED APPLICATION

This application claims priority from and the benefit of Korean Patent Application No. 10-2015-0066052, filed on May 12, 2015, which is hereby incorporated by reference for all purposes as if fully set forth herein.

BACKGROUND

Field

Exemplary embodiments relate to a touch screen panel. More particularly, exemplary embodiments relate to a touch screen panel including a capacitive type touch sensor.

Discussion of the Background

Display devices, such as a liquid crystal display (LCD), an organic light emitting diode (OLED) display, and an electrophoretic display, include a field generating electrode and an electro-optical active layer. For example, the OLED display includes an organic emission layer as the electro-optical active layer. The field generating electrode is connected to a switching element, such as a thin film transistor, to receive a data signal, and the electro-optical active layer converts the data signal to an optical signal to display an image.

Recently, such a display device may include a touch sensing function in which interaction with a user can be performed, in addition to a function of displaying the image. The touch sensing function determines touch information, such as whether an object approaches or touches a screen, a touch position thereof, and the like, by sensing changes in pressure, charges, light, and the like, which are applied onto the screen by the display device whenever a user writes a text or draws a figure by approaching or touching the screen with a finger or a touch pen. The display device may receive an image signal based on the touch information to display an image.

The touch sensing function may be implemented by a touch sensor. The touch sensor may be classified into various types, such as a resistive type, a capacitive type, an electromagnetic (EM) type, and an optical type.

In the case of the resistive type touch sensor, two electrodes that are spaced apart from each other while facing each other may contact each other by pressure due to an external object. When two electrodes contact each other, a change in voltage according to a resistance change at a touch position is recognized, and thus, the touch position and the like may be determined.

The capacitive type touch sensor includes a sensing capacitor configured by a sensing electrode which may transfer the sensing signal, and may determine whether there is a touch, a touch position, and the like by sensing a change in capacitance of the sensing capacitor generated when a conductor, such as a finger, approaches the sensor. The capacitive type touch sensor may sense the touch only when a user touches a touch screen and requires a touch by a conductive object.

The touch screen may be included in a flexible electronic device that has been recently developed. However, as a result of the flexible characteristic of the flexible electronic device, it has been determined that an electrode of the touch screen should also have flexibility so as to prevent a defect from being generated.

The flexible material of the electrode may include, for example, various materials, such as a metal nano wire, such as silver nano wire (AgNW), a carbon nanotube, graphene, a metal mesh, or a conductive polymer.

Because such materials have low conductivity, in order to compensate for conductivity on a pad of the touch screen, a separate pad is required as a low resistive metal, such as copper.

However, when an external signal is applied to the pad and the pad is exposed, the pad is easily oxidized to produce corrosion that may be dispersed over the entire touch sensor. As a result, the reliability of the screen may be markedly reduced.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel having advantages of preventing corrosion of a pad while using a low resistive metal.

Additional aspects will be set forth in the detailed description which follows, and, in part, will be apparent from the disclosure, or may be learned by practice of the inventive concept.

An exemplary embodiment of the present invention discloses a touch screen panel including: a plurality of touch electrodes disposed in a touch area of a substrate, the touch electrodes being configured to sense a touch; and a connecting wire connected with the touch electrode and including a pad connected to one end. The connecting wire includes a first wire layer made of a metal nano wire positioned on the substrate, a second wire layer made of a first transparent conductive material, a third wire layer disposed on an upper surface of the second wire layer and made of a second transparent conductive material, and a fourth wire layer disposed on the third wire layer and made of aluminum (Al).

An exemplary embodiment of the present invention also discloses a method of manufacturing a touch screen panel including: forming a first conductive layer including a metal nano wire on a substrate including a touch area and a peripheral area, a second conductive layer made of a first transparent conductive material, a third conductive layer made of a second transparent conductive material, and a fourth conductive layer made of aluminum; forming a first wire layer by patterning the fourth conductive layer in the peripheral area; and forming a second wire layer on a lower surface of the first wire layer by patterning the third conductive layer in the peripheral area. The first transparent conductive material and the second transparent conductive material have different etch selectivities.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
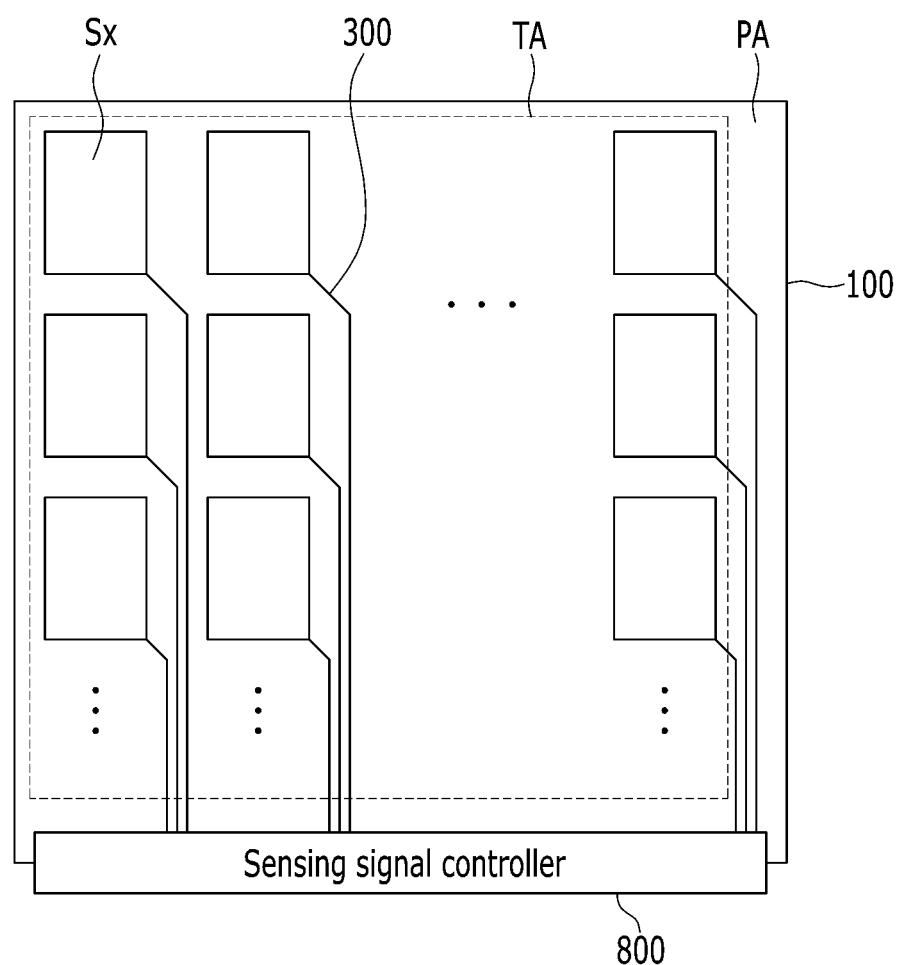
FIG. 1 is a schematic plan view of a touch screen panel according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic plan view of a touch screen panel according to an exemplary embodiment of the present invention.

As illustrated in FIG. 1, a touch screen panel according to the exemplary embodiment of the present invention includes a touch sensor and a sensing signal controller 800 connected with the touch sensor.

The touch sensor according to the exemplary embodiment of the present invention may utilize various types of touch sensors, but in the exemplary embodiment, a capacitive type touch sensor will be described as an example.

The touch sensor is included in a display panel or a separate touch panel to sense a touch. In the exemplary embodiment, an example will be described below in which the touch sensor is included in the touch screen panel. Here, the touch includes not only directly touching but also approaching an external object on the display panel or the touch panel.

The touch sensor according to the exemplary embodiment of the present invention includes a plurality of touch electrodes Sx disposed in an active area of a substrate 100 used as the touch panel, and a plurality of connecting wires 300 connected with the touch electrodes Sx. The active area is an area in which the touch may be applied and sensed and, in the case of the display panel, for example, the active area may overlap with a display area in which the image is displayed. In the case of the substrate 100 used as the touch panel, the active area may be a touch area, and when the touch panel is installed in the display panel, the touch area may overlap with the display area. Hereinafter, the active area is also referred to as a touch area TA.

The plurality of touch electrodes Sx may be arranged in a matrix form and formed on the same layer as each other when viewed from a cross-sectional structure. The touch electrode Sx may include a transparent conductive material, such as indium tin oxide (ITO) and indium zinc oxide (IZO) and a metal nanowire, but is not limited thereto. The metal nano wire may be a silver (Ag) nano wire.

A shape of the touch electrode Sx may be a quadrangle, as illustrated in FIG. 1, but is not limited thereto, and may have various other shapes. The touch electrode Sx may include a plurality of protrusions and depressions (not illustrated) formed at an edge side in order to enhance touch sensitivity. When the edge side of the touch electrode Sx includes the plurality of protrusions and depressions, uneven edge sides of the adjacent touch electrodes Sx may engage with each other.

A length of one side of the touch electrode Sx may be approximately several mm, for example, approximately 10 mm or less and, more specifically, approximately 4 mm to 5 mm, but a size of the touch electrode Sx may be appropriately controlled according to a touch sensing resolution.

The touch electrodes Sx are separated from each other in the touch area, and different touch electrodes Sx may be connected with the sensing signal controller 800 through different connecting wires 300.

The touch electrodes Sx according to the exemplary embodiment receive sensing input signals from the sensing signal controller 800 through connecting wires 300, and each touch electrode Sx generates a sensing output signal according to a touch to transmit the generated sensing output signal to the sensing signal controller 800. Each touch electrode Sx forms a self-sensing capacitor to receive the sensing input signal and then may be charged with a predetermined charge amount. Thereafter, when an external object, such as a finger, is touched, the charge amount of the self-sensing capacitor is changed, and thus, a sensing output signal different from the input sensing input signal may be output. As such, touch information, such as whether there is a touch and a touch position, may be determined through the changed sensing output signal.

The connecting wire 300 connects the touch electrode Sx and the sensing signal controller 800 to transfer the sensing input signal or the sensing output signal. The connecting wire 300 may be disposed on the same layer as the touch electrode Sx and may be made of the same material as the touch electrode Sx. However, the present invention is not limited thereto, and the connecting wire 300 may be disposed on a different layer from the touch electrode Sx and connected with the touch electrode Sx through a separate connecting part.

In the exemplary embodiment illustrated in FIG. 1, the number of connecting wires 300 disposed between touch electrode Sx columns is increased toward the sensing signal controller 800. Accordingly, the width of the touch electrode Sx may be decreased toward the sensing signal controller 800.

A width of the connecting wire 300 may be in a range of approximately 10 μm to 100 μm, but is not limited thereto. Accordingly, the connecting portion of the touch electrode Sx and the connecting wire 300 form a bottle neck portion of which a width is rapidly increased or decreased.

The sensing signal controller 800 is connected with the touch electrode Sx of the substrate 100 to transfer the sensing input signal to the touch electrode Sx and receive the sensing output signal. The sensing signal controller 800 processes the sensing output signal to generate the touch information, such as whether there is a touch and a touch position.

The sensing signal controller 800 may be disposed on a printed circuit board separate from the substrate 100 to be connected with the substrate 100; attached on the substrate 100 in an IC chip form or a TCP form; or integrated on the substrate 100.

Hereinafter, an interlayer configuration of the touch screen panel according to the exemplary embodiment of the present invention will be described in more detail.

Figure 2:
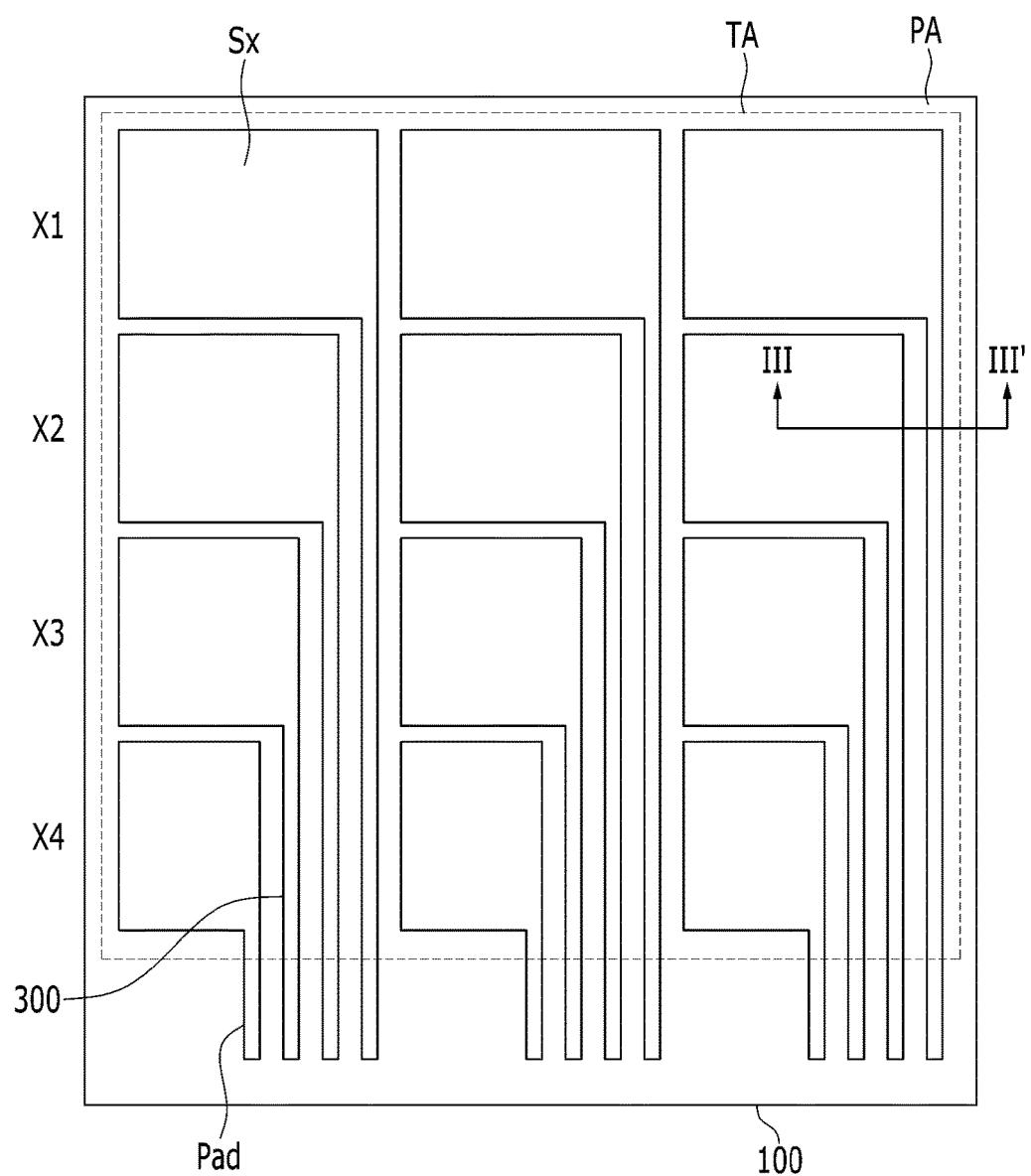
FIG. 2 is a layout view of a touch electrode according to the exemplary embodiment of the present invention.

FIG. 2 is a layout view of a touch electrode according to the exemplary embodiment of the present invention.

As illustrated in FIG. 2, the touch screen panel according to the exemplary embodiment of the present invention includes a substrate 100, and a plurality of touch electrodes Sx disposed in a matrix on the substrate 100.

Referring to FIG. 2, the plurality of touch electrodes Sx is disposed in one direction at regular intervals. Each touch electrode Sx may be connected with a pad through the connecting wire 300. The connecting wire 300 may provide an input signal to the touch electrode Sx or an output signal to the sensing signal controller through the pad.

Most of the connecting wires 300 are disposed in the touch area TA, where the touch electrodes Sx are formed, and connected with the pad positioned in a peripheral area PA outside the touch area TA, respectively. That is, the connecting wire 300 is connected with one side of the touch electrode Sx facing the pad and positioned between two adjacent touch electrodes Sx.

When the connecting wire 300 is positioned between the touch electrodes Sx, the width of the peripheral area PA where the pad is not formed may be further reduced.

Because the touch electrode Sx is adjacent to the pad, an area of the touch electrode Sx may be decreased. This is because the connecting wire 300 is connected with the pad without bending from one side of the touch electrode Sx in a straight line, and the width of the touch electrode Sx is decreased by a width of the connecting wire 300 and a distance between the connecting wires.

Accordingly, an area of the touch electrode Sx in a first row X1 which is positioned farthest away from the pad is the largest, and an area of the touch electrode Sx in a fourth row X4 positioned closest to the pad is the smallest. This is because the first row X1, the second row X2, and the connecting wire 300 connected with the touch electrode Sx of the third row X3 pass between the touch electrodes Sx positioned in the fourth row X4.

In FIG. 2, touch electrodes with three columns and four rows are illustrated, but the present invention is not limited thereto and if necessary, the touch electrodes may be arranged in more rows and columns.

The touch electrodes Sx according to the exemplary embodiment of the present invention receive the sensing input signal through the connecting wires 300 and then are charged with a predetermined charging amount. Thereafter, when an external object, such as a finger is touched, the charge amount of the self-sensing capacitor is changed, and thus, a sensing output signal different from the input sensing input signal may be output. As such, touch information, such as whether there is a touch and a touch position, may be determined through the changed sensing output signal.

The substrate 100 may include plastic, such as polycarbonate, polyimide, and polyether sulfone, glass, or the like. The substrate 100 may be a transparent flexible substrate having flexibility, such as a foldable characteristic, a bendable characteristic, a rollable characteristic, or elasticity, such as being stretchable in at least one direction.

Figure 3:
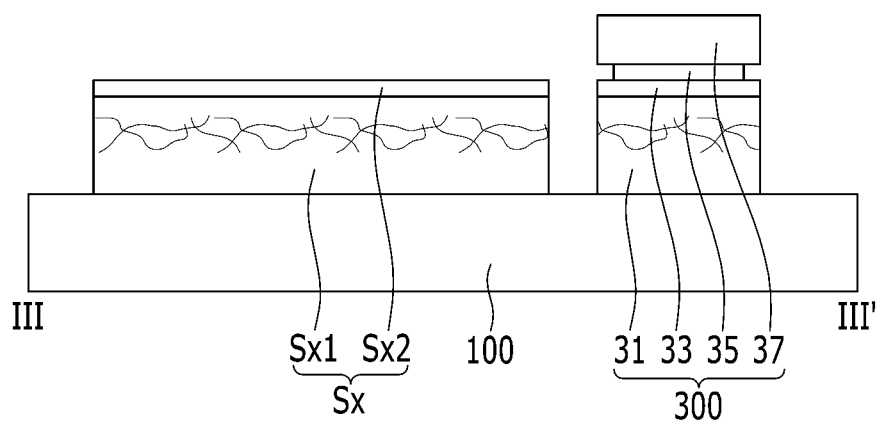
FIG. 3 is a cross-sectional view illustrating an example of a cross section of the touch screen panel taken along line of FIG. 2.

Next, FIG. 3 is a cross-sectional view illustrating an example of a cross section of the touch screen panel taken along line of FIG. 2.

First, referring to FIGS. 2 and 3, a plurality of touch electrodes Sx, and a plurality of connecting wires 300 for connecting the touch electrodes Sx and a plurality of pads are formed on the substrate 100.

A first electrode Sx1 and a first wire layer 31 may be made of metal nano wires. The metal nano wire may include a metal wire, such as silver (Ag) and copper (Cu). The metal nano wires are connected to each other in a network to form a conductive electrode. The metal nano wire may be formed by a solution process, such as slit coating, inkjet printing, and spraying.

The first electrode Sx1 and the first wire layer 31 may further include a polymer resin, which may protect the metal nano wire and fix the metal nano wire. The polymer resin may include an acrylate-based organic material, such as an acryl polyester resin. The polymer resin is mixed and coated with the metal nano wire, or after the metal nano wire layer is formed, the polymer resin may be coated on the metal nano wire layer. The polymer resin fills a space between the metal nano wires and may enhance adhesion between the metal nano wires and the substrate 100.

The first electrode Sx1 and the first wire layer 31 have high transmissivity, and may have high conductivity due to a surface resistance characteristic of a predetermined level or less. Further, the first electrode Sx1 and the first wire layer 31 may be more flexible than other metal thin films.

A second electrode Sx2 and a second wire layer 33 have transmissivity of a predetermined level or more as a layer for compensating for conductivity of the first electrode Sx1 and the first wire layer 31 and include transparent conductive materials, which are dry-etchable. For example, the second electrode Sx2 and the second wire layer 33 may be indium tin oxide (ITO) or indium zinc oxide (IZO), and may have transmittance of approximately 85% or more in a visible light area.

A third wire layer 35 is made of a transparent conductive material, which is not influenced by dry-etching, as a layer for protecting the second wire layer 33 from dry-etching when the dry-etching is performed on a fourth wire layer 37, described below. For example, the third wire layer 35 may be metal oxide, such as gallium doped zinc-oxide (ZnO) (GZO) or in doped ZnO (ZIO). The material included in the third wire layer 35 has higher selectivity than a material included in the second wire layer 33 below when wet-etching is performed.

The fourth wire layer 37 may be made of aluminum (Al) which is a low resistive metal.

Here, when the third wire layer 35 includes GZO or ZIO, and GZO or ZIO has a characteristic content of 50% or more ZnO. In contrast, IZO configuring the second electrode Sx2 and the second wire layer 33 has a characteristic in which the content of Zn is less than 10%. Accordingly, the etching process applied when the second wire layer 33 and the third wire layer 35 are formed varies according to the content of Zn. This will be described in a manufacturing process of the touch screen panel to be described below.

The first electrode Sx1 and the second electrode Sx2 have the same planar shape, and the first wire layer 31, the second wire layer 33, the third wire layer 35, and the fourth wire layer 37 have the same planar shape.

Hereinafter, a method for manufacturing the touch screen panel according to the exemplary embodiment of the present invention will be described in more detail with reference to the accompanying drawings.

In order to manufacture the touch screen panel, masks for forming the touch electrodes and the wires are required, respectively, and a photolithography process and an etching process using the masks are performed. The photolithography process includes forming a photosensitive film, exposing the photosensitive film by using the mask, and developing the exposed layer. The etching process is divided into a wet etch and a dry etch according to the method, as a process of partially removing thin films formed on the entire surface of the substrate through a mask pattern. The wet etch means all kinds of etching which mainly use a liquid chemical, and the dry etch comprehensively means all etching process using plasma.

Figure 4:
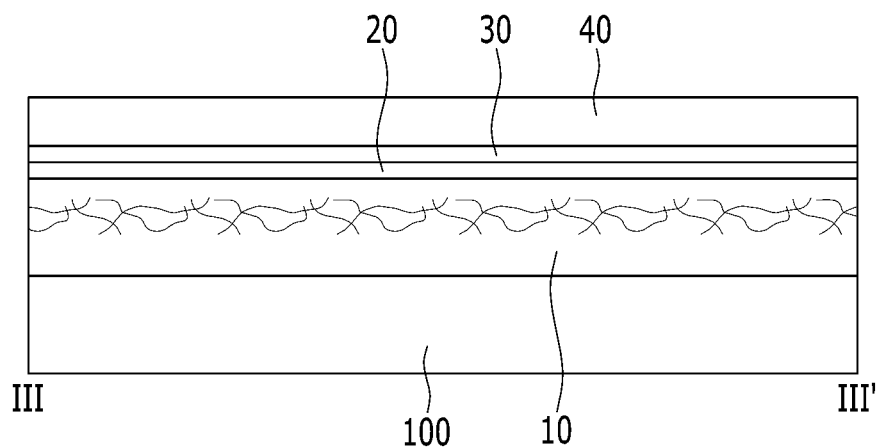
FIG. 4 is a cross-sectional view for describing a method of manufacturing the touch screen panel illustrated in FIG. 3.
Figure 5:
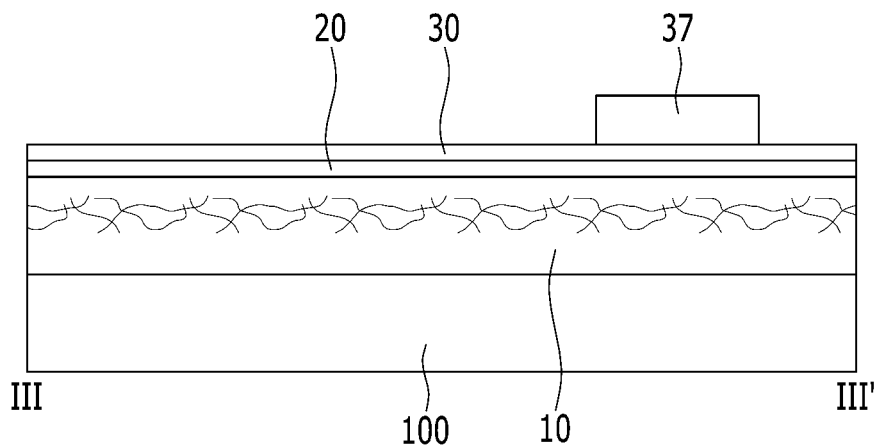
FIG. 5 is a cross-sectional view in a next step of FIG. 4.
Figure 6:
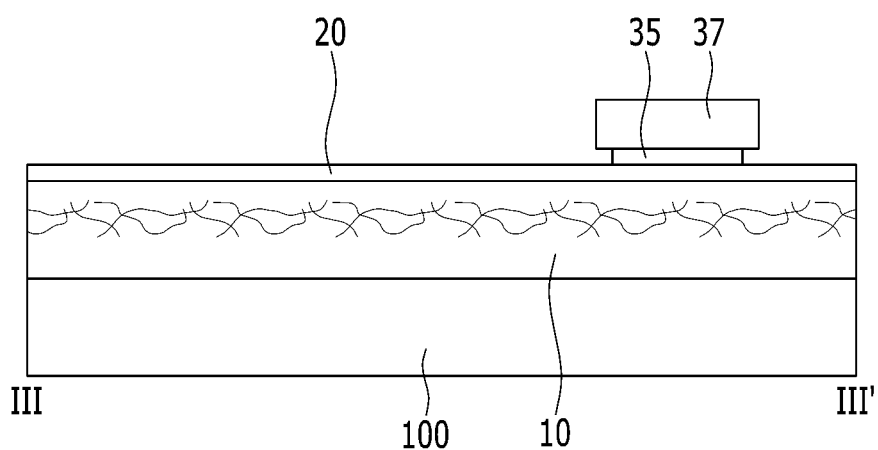
FIG. 6 is a cross-sectional view of a next step of FIG. 5.

FIG. 4 is a cross-sectional view for describing a method of manufacturing the touch screen panel according to the exemplary embodiment of the present invention; FIG. 5 is a cross-sectional view in a next step of FIG. 4; and FIG. 6 is a cross-sectional view of a next step of FIG. 5.

As illustrated in FIG. 4, on the substrate 100, a first conductive layer 10, a second conductive layer 20, a third conductive layer 30, and a fourth conductive layer 40 are formed.

The first conductive layer 10 may include a silver nano wire, and the silver nano wire may be coated with a polymer resin by a solution process. Further, the first conductive layer 10 may be formed of a dry film resist (DFR) including the silver nano wire.

The second conductive layer 20 is formed of a transparent conductive material by depositing ITO or IZO.

The third conductive layer 30 is formed of a transparent conductive material by depositing GZO or ZIO.

In addition, the fourth conductive layer 40 is formed by depositing aluminum (Al).

As illustrated in FIG. 5, the fourth wire layer 37 made of aluminum is formed by patterning the fourth conductive layer by using dry etch, and the fourth conductive layer is deposited with aluminum and uses dry etch using chlorine (Cl)-based gas.

As illustrated in FIG. 6, the third wire layer 35 is formed by patterning the third conductive layer by using wet etch. Because the third conductive layer 30 is formed by laminating GZO or ZIO, a wet etchant has sufficient selectivity so as not to etch almost the second conductive layer 20 below the third conductive layer 30 while etching GZO or ZIO.

In this case, because the wet etch process may be performed after the dry etch process for forming the fourth wire layer 37; the third wire layer 35 may be etched by a structure in which the third wire layer 35 is under-cut below the fourth wire layer 37.

Thereafter, as illustrated in FIGS. 2 and 3, the second wire layer 33 and the first wire layer 31 configuring the connecting wire 300 are formed, and the touch electrode Sx configured by the second electrode Sx2 and the first electrode Sx1 are formed, by simultaneously patterning the second conductive layer 20 and the first conductive layer 10 by the same etch process.

Because the second conductive layer 20 and the first conductive layer 10 are simultaneously etched, the second electrode Sx2 and the first electrode Sx1 have the same planar shape, and the second wire layer 33 and the first wire layer 31 may have the same planar shape. However, the present invention is not limited thereto, and if necessary, the second conductive layer may be etched after patterning the first conductive layer.

Next, a cross section of the touch screen panel according to another exemplary embodiment of the present invention will be described with reference to FIGS. 2 and 7.

Figure 7:
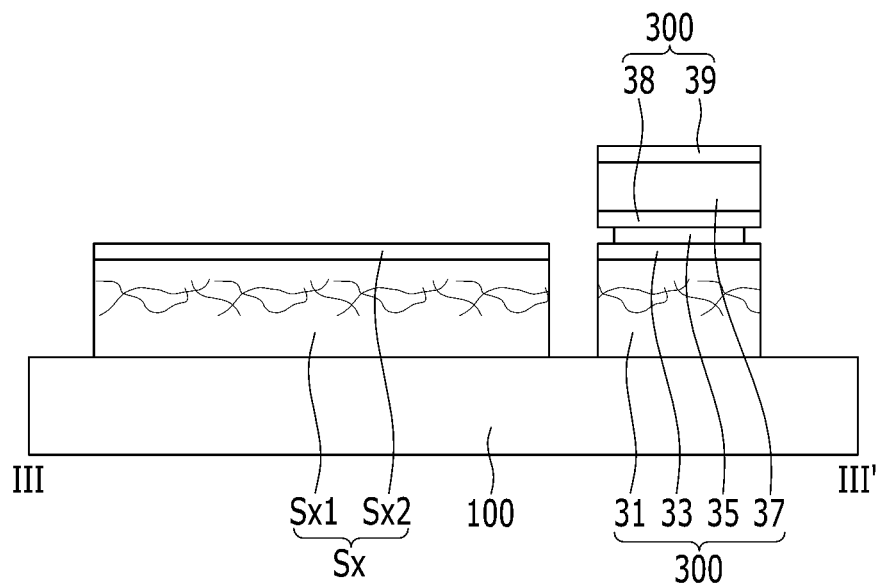
FIG. 7 is a cross-sectional view illustrating another example of a cross section of the touch screen panel taken along line of FIG. 2.

FIG. 7 is a cross-sectional view illustrating another example of a cross section of the touch screen panel taken along line of FIG. 2.

The touch screen panel illustrated in FIG. 7 is the same as the exemplary embodiment illustrated in FIG. 3, except for the feature in which a conductive material layer is selectively formed on and below the fourth wire layer 37 is illustrated.

Referring to FIG. 7, a plurality of touch electrodes Sx formed on the touch area TA of the substrate 100 is the same as that of the exemplary embodiment described above in FIG. 3. The touch electrodes Sx include a first electrode Sx1 and a second electrode Sx2.

The connecting wire 300 illustrated in FIG. 7 is configured in a form in which a first wire layer 31, a second wire layer 33, a third wire layer 35, a fifth wire layer 38, a fourth wire layer 37, and a sixth wire layer 39 are laminated. The fifth wire layer 38 is disposed on a lower surface of the fourth wire layer 37, and the sixth wire layer 39 is disposed on an upper surface of the fourth wire layer 37. That is, the fourth wire layer 37 may be disposed between the fifth wire layer 38 and the sixth wire layer 39.

The fifth wire layer 38 and the sixth wire layer 39 are made of metal materials which are dry-etched, such as molybdenum (Mo) and titanium (Ti). The fifth wire layer 38 prevents oxidization between the fourth wire layer 37 made of aluminum and the third wire layer 35 made of an oxide metal component from being generated and corresponds to a buffer layer. The sixth wire layer 39 is disposed on the fourth wire layer 37 for pad reliability, and corresponds to a capping layer.

Because the fourth wire layer 37 may be made of aluminum (Al), which is a low resistive metal, the fifth wire layer 38 and the sixth wire layer 39 may be dry-etched with the fourth wire layer 37. For example, aluminum (Al), molybdenum (Mo), titanium (Ti), or the like may be etched by reacting with chlorine (Cl)-based gas during a dry etch process, and molybdenum (Mo), titanium (Ti), or the like is etched by reacting with fluorine (F)-based gas.

Figure 8:
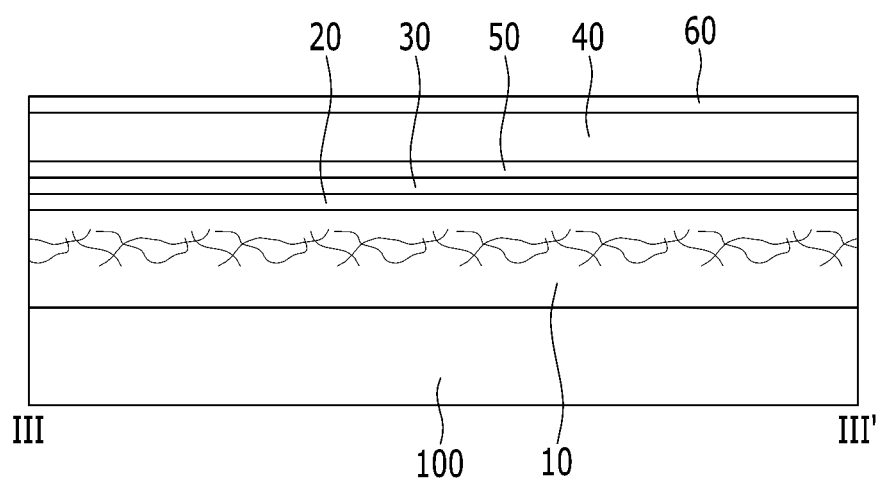
FIG. 8 is a cross-sectional view for describing a method of manufacturing the touch screen panel illustrated in FIG. 7.
Figure 9:
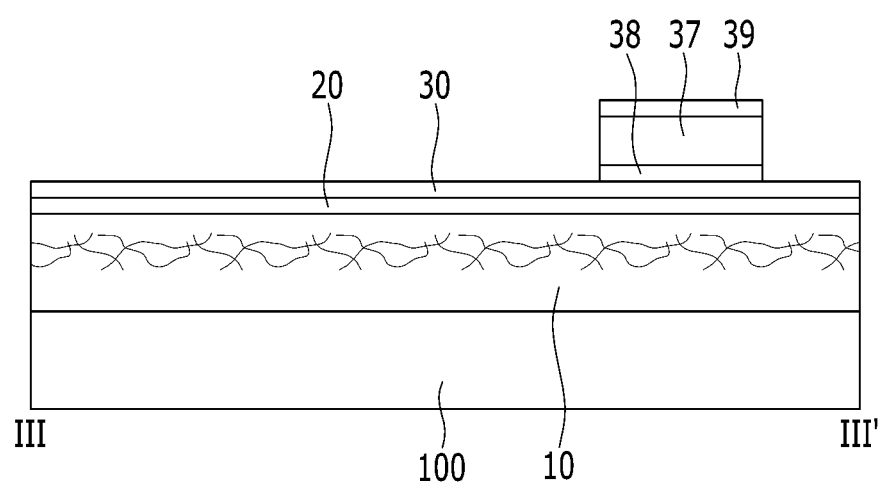
FIG. 9 is a cross-sectional view of a next step of FIG. 8.

FIG. 8 is a cross-sectional view illustrating a method of manufacturing the touch screen panel according to another exemplary embodiment of the present invention illustrated in FIG. 7, and FIG. 9 is a cross-sectional view for describing the method of manufacturing the touch screen panel in a next step of FIG. 8.

As illustrated in FIG. 8, on the substrate 100, a first conductive layer 10, a second conductive layer 20, a third conductive layer 30, a fourth conductive layer 40, a fifth conductive layer 50, and a sixth conductive layer 60 are formed. In this case, the fourth conductive layer 40 formed on the substrate is disposed between the fifth conductive layer 50 and the sixth conductive layer 60.

The fifth conductive layer 50 and the sixth conductive layer 60 are made of a metal material, such as molybdenum (Mo) and titanium (Ti), the fourth conductive layer 40 is made of a low resistive metal material, such as aluminum (Al), and all of the fourth conductive layer 40, the fifth conductive layer 50, and the sixth conductive layer 60 may perform patterning by a dry etching.

As illustrated in FIG. 9, the sixth wire layer 39, the fourth wire layer 37, and the fifth wire layer 38 are formed by patterning a metal conductive layer formed by the fifth conductive layer 50, the fourth conductive layer 40, and the sixth conductive layer 60 by using dry etch.

Because all of molybdenum (Mo), titanium (Ti), and aluminum (Al) are etched by reacting with Cl-based gas, the sixth wire layer 39, the fourth wire layer 37, and the fifth wire layer 38 may be simultaneously formed through dry etch using Cl-based gas. Alternatively, because molybdenum (Mo) and titanium (Ti) are etched by reacting with F-based gas, the etch process may be divided by the methods of forming the sixth wire layer 39 and the fifth wire layer 38 by dry etch based on F-based gas and forming the fourth wire layer 37 by dry etch based on Cl-based gas.

As described above in FIG. 6, the third wire layer 35 is formed by patterning the third conductive layer by using wet etch.

In addition, as illustrated in FIGS. 2 and 7, the second wire layer 33 and the first wire layer 31 of the connecting wire 300 are formed and the touch electrode Sx configured by the second electrode Sx2 and the first electrode Sx1 is formed, by patterning the second conductive layer 20 and the first conductive layer 10 by the etch process.

According to exemplary embodiments of the present invention, it is possible to provide a wire structure of the touch screen panel favorable to patterning while using an aluminum wire with high folding reliability.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch screen panel, comprising:
   a plurality of touch electrodes disposed in a touch area of a substrate, the touch electrodes configured to sense a touch; and
   a connecting wire connected with the touch electrode, the connecting wire comprising a pad connected to one end,
   wherein the connecting wire comprises:
   a first conductive wire layer disposed on the substrate and comprising a metal nano wire;

a second conductive wire layer disposed on the first conductive wire layer and consisting of a first transparent conductive material including a first metal oxide;

a third conductive wire layer disposed on the second conductive wire layer and consisting of a second transparent conductive material including a second metal oxide; and a fourth conductive wire layer disposed on the third conductive wire layer and comprising aluminum, wherein:

the fourth conductive wire layer overlaps the third conductive wire layer, and a width of the third conductive wire layer is less than a width of the fourth conductive wire layer; and the fourth conductive wire layer contacts only the third conductive wire layer among the first conductive wire layer, the second conductive wire layer, and the third conductive wire layer.

2. The touch screen panel of claim 1, wherein the first transparent conductive material and the second transparent conductive material have different etch selectivities.

3. The touch screen panel of claim 2, wherein:
the first metal oxide is different from the second metal oxide.

4. The touch screen panel of claim 3, wherein the fourth conductive wire layer is formed by dry etch using a Cl-based gas.

5. The touch screen panel of claim 4, wherein the third conductive wire layer is formed through a wet etch.

6. The touch screen panel of claim 5, wherein the width of the third conductive wire layer is less than a width of the second conductive wire layer.

7. The touch screen panel of claim 6, further comprising:
a fifth conductive wire layer disposed between the third conductive wire layer and the fourth conductive wire layer; and
a sixth conductive wire layer disposed on the fourth conductive wire layer.

8. The touch screen panel of claim 6, wherein the fifth conductive wire layer and the sixth conductive wire layer comprise at least one of molybdenum (Mo) and titanium (Ti).

9. The touch screen panel of claim 8, wherein the fifth conductive wire layer and the sixth conductive wire layer are formed by the same dry etch process together with the fourth conductive wire layer.

10. The touch screen panel of claim 3, wherein the first metal oxide comprises at least one of IZO and ITO.

11. The touch screen panel of claim 3, wherein the second metal oxide comprises at least one of GZO and ZIO.

12. The touch screen panel of claim 1, wherein the touch electrode comprises:
a first touch electrode disposed on the substrate; and
a second touch electrode disposed on the upper surface of the first touch electrode.

13. The touch screen panel of claim 12, wherein:
the first touch electrode comprises the metal nano wire; and
the second touch electrode comprises the first transparent conductive material.

14. A method of manufacturing a touch screen panel, comprising:
forming conductive layers including a first conductive layer comprising a metal nano wire on a substrate, a second conductive layer consisting of a first transparent conductive material including a first metal oxide on the first conductive layer, a third conductive layer consisting of a second transparent conductive material including a second metal oxide on the second conductive layer, and a fourth conductive layer comprising aluminum on the third conductive layer;
forming a fourth conductive wire layer of a connecting wire by patterning the fourth conductive layer in the peripheral area;
forming a third conductive wire layer of the connecting wire by patterning the third conductive layer in the peripheral area; and
forming a second conductive wire layer and a first conductive wire layer of the connecting wire by patterning the second conductive layer and the first conductive layer in the peripheral area, wherein:

the first transparent conductive material and the second transparent conductive material have different etch selectivities;

the fourth conductive wire layer overlaps the third conductive wire layer, and a width of the third conductive wire layer is less than a width of the fourth conductive wire layer; and the fourth conductive wire layer contacts only the third conductive wire layer among the first conductive wire layer, the second conductive wire layer, and the third conductive wire layer.

15. The method of claim 14, wherein the forming of the fourth conductive wire layer uses a dry etch process using Cl-based gas.

16. The method of claim 15, wherein the forming of the third conductive wire layer uses a wet etch process.

17. The method of claim 16, wherein a plurality of touch electrodes are formed in a touch area of the substrate by simultaneously patterning the second conductive layer and the first conductive layer.

18. The method of claim 17, wherein:
the forming of the conductive layers further comprises:
forming a fifth conductive layer on the third conductive layer;
forming the fourth conductive layer on the fifth conductive layer; and
forming a sixth conductive layer on the fourth conductive layer.

19. The method of claim 18, wherein the fifth conductive layer and the sixth conductive layer comprise at least one of molybdenum (Mo) and titanium (Ti).

20. The method of claim 19, wherein, in the forming of the fourth conductive wire layer, the fifth conductive layer and the sixth conductive layer are etched together with the fourth conductive layer.

* * * * *